(12) United States Patent
Kea

(10) Patent No.: US 6,538,406 B1
(45) Date of Patent: Mar. 25, 2003

(54) SYSTEM AND METHOD FOR IMPROVING TRANSIENT SPEED RESPONSE OF ELECTRIC MOTORS

(75) Inventor: Eugene Filmore Kea, Boones Mill, VA (US)

(73) Assignee: General Electric Co., Schnectady, NY (US)

(*) Notice: Subject to any disclaimer, the term of this patent is extended or adjusted under 35 U.S.C. 154(b) by 42 days.

(21) Appl. No.: 09/702,982

(22) Filed: Oct. 31, 2000

(51) Int. Cl.[7] .................................................. H02P 7/00
(52) U.S. Cl. ........................ 318/434; 318/138; 318/254; 318/430; 318/432; 318/433; 388/842; 388/848
(58) Field of Search ................................. 318/430, 432, 318/433, 434, 138, 254; 388/842, 848

(56) References Cited

U.S. PATENT DOCUMENTS

| | | | | |
|---|---|---|---|---|
| 3,629,633 A | * | 12/1971 | O'Callaghan | 310/94 |
| 3,955,130 A | * | 5/1976 | Graf | 318/332 |
| 3,983,464 A | * | 9/1976 | Peterson | 318/327 |
| 4,028,601 A | * | 6/1977 | Peterson | 318/271 |
| 4,152,632 A | * | 5/1979 | Peterson | 318/317 |
| 4,280,081 A | | 7/1981 | Dinger et al. | 318/6 |
| 4,322,668 A | * | 3/1982 | Trussler et al. | 318/434 |
| 4,605,887 A | * | 8/1986 | Boella | 318/594 |
| 5,525,877 A | * | 6/1996 | Umida | 318/432 |

* cited by examiner

Primary Examiner—Robert E. Nappi
Assistant Examiner—Tyrone Smith
(74) Attorney, Agent, or Firm—Karl Vick; Kevin Duncan; Hunton & Williams (57) ABSTRACT

A system and method for improving transient speed response of electric motors includes a comparator that determines a difference between a current reference and an adjusted current reference generated by the electric motor drive system, and an integrator the receives and integrates the difference between the current reference and the adjusted current reference over time to yield total accumulated lost current-seconds, and outputs at least a portion of the integrated difference between the current reference and the adjusted current reference as current-seconds to be added to the current reference. The present invention keeps track of the total accumulated loss-seconds due to current rate limitations, and restores the total accumulated lost current-seconds to the system when current becomes available.

20 Claims, 9 Drawing Sheets

SYSTEM AND METHOD FOR IMPROVING TRANSIENT SPEED RESPONSE OF ELECTRIC MOTORS

BACKGROUND OF THE INVENTION

This invention relates to electric motors and, more particularly, to a system and method for improving the transient speed response of electric motors in the presence of drive current response rate limitations.

Drive systems for variable speed electric motors are often limited in how quickly they can change the speed of the electric motor. This is due to the fact that the rate of change in the drive current needed to effectuate a rapid change in motor speed cannot be achieved due to motor design limitations and/or the lack of an adequate forcing voltage.

U.S. Pat. No. 4,280,081, which is herein incorporated by reference in its entirety, discloses an inertia compensation method to improve the acceleration and deceleration performance of motor drive systems. However, this method, as well as other prior art inertia compensation methods, do not address the limited transient speed response imposed by drive current response rate limitations (hereinafter "current rate limitations").

BRIEF SUMMARY OF THE INVENTION

In an exemplary embodiment of the invention, a drive system for an electric motor comprises a current reference generator that generates and outputs a current reference based on a speed reference, a current rate limiter that receives the current reference and outputs an adjusted current reference based on available current, a current rate recovery system that determines total accumulated lost current-seconds due to the current rate limiter and outputs current-seconds to be added to the adjusted current reference, and an adder that adds the current-seconds to the adjusted current reference output by the current rate limiter until the total accumulated lost current-seconds are applied to the electric motor.

The invention also provides a current rate recovery system for an electric motor drive system, comprising a comparator that determines a difference between a current reference and an adjusted current reference generated by the electric motor drive system, and an integrator that receives and integrates the difference between the current reference and the adjusted current reference over time, and outputs at least a portion of the integrated difference between the current reference and the adjusted current reference as current-seconds to be added to the adjusted current reference.

The present invention also provides a method of compensating for current-rate limitations in an electric motor drive system, comprising the steps of monitoring total accumulated current-seconds lost due to a lack of available current, and recovering the total accumulated lost current-seconds as sufficient current becomes available.

The present invention keeps track of the total accumulated lost current-seconds due to current rate limitations, and restores the total accumulated lost current-seconds to the system when current becomes available.

DETAILED DESCRIPTION OF THE INVENTION

Figure 1:
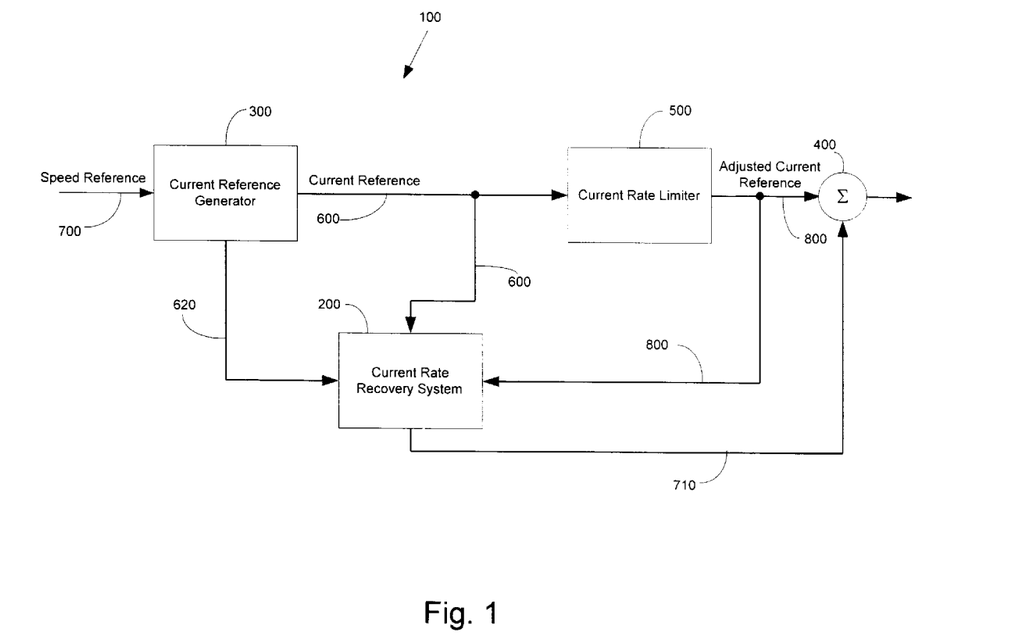
FIG. 1 is a block diagram of a drive system for an electric motor incorporating a current rate recovery system, in accordance with one embodiment of the present invention.

FIG. 1 shows a drive system for an electric motor 100 incorporating a current rate recovery system 200, in accordance with one embodiment of the present invention. The system 100 includes a current rate recovery system 200, a current reference generator 300, and adder 400 and current rate limiter 500.

In operation, the current reference generator 300 generates a current reference 600 based on a speed reference value 700. The speed reference 700 corresponds to a desired motor speed, and is typically given in revolutions per minute.

The current reference generator 300 determines, based on the desired speed represented by speed reference 700, a current reference 600 that will generate the desired motor speed. The current reference 600 is preferably compensated for load torque changes in the electric motor, as well as for speed changes that result from acceleration and deceleration. The inertia compensated current reference value 620 is preferably sent to the current rate recovery system, for reasons that will be explained in more detail below. These compensation methods are well known in the art. For example, see U.S. Pat. No. 4,280,081, issued Jul. 21, 1981 for a description of a motor drive system with inertia compensation.

If the current reference generator compensates for inertia and for load torque changes in the motor, the current reference signal 600 will include a first portion 630 that is compensated for load torque changes in the motor, and a second portion 620 that is inertia compensated.

The current reference 600 is sent to the current rate limiter 500. The current rate limiter 500 outputs an adjusted current reference 800 that is based on current rate limitations. Thus, the current rate limiter 500 limits the current reference to a value that is capable of being achieved by the drive system. Some of the things that could limit the available current include motor design limitations and a lack of adequate forcing voltage in the drive system to change the current quickly enough. The adder 400 adds current-seconds 710 from the current rate recovery system 200 to the adjusted current reference 800. The current-seconds from the current rate recovery system 200 will be explained in more detail below.

The current rate recovery system 200 determines total accumulated lost current-seconds due to the action of the current rate limiter 500. The current rate recovery 200 receives the adjusted current reference value 800 and the current reference value 610 input into the current rate limiter 500. By comparing these two values, the current rate recovery system determines the total accumulated lost current-seconds. Current-seconds 710 are sent to the adder 400 to be added to adjusted current reference value 800 until all of the total accumulated lost current-seconds are recovered.

Thus, a closed loop is formed that continues to add current-seconds 710 to the adjusted current reference value 800 output from the current rate limiter 500 until the total accumulated lost-seconds are restored. The accumulated lost current-seconds are restored as current becomes available.

Figure 2:
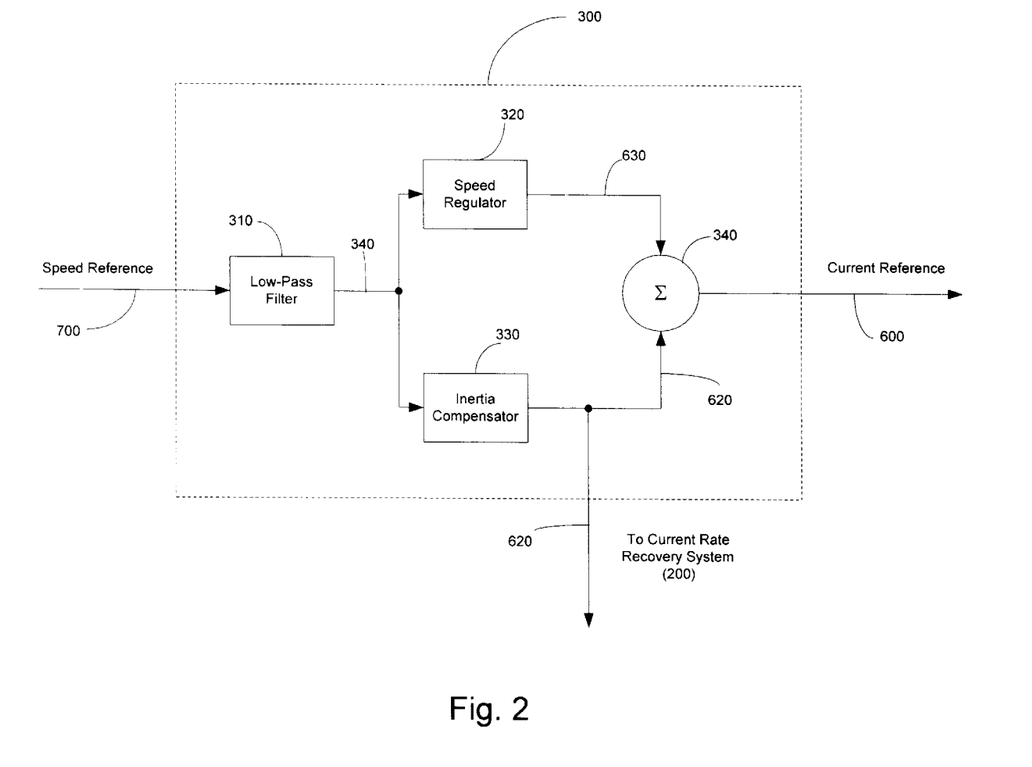
FIG. 2 is a block diagram of one preferred embodiment of the current reference generator of FIG. 1.

FIG. 2 shows one preferred embodiment of the current referenced generator 300 of FIG. 1. The current reference generator 300 provides a low-pass filter 310, a speed regulator 320, and inertia compensator 330 and an adder 340.

The low-pass filter 310 receives the speed reference signal 700 and performs a low-pass filtering operation. The filtered speed reference signal 340 is sent to the speed regulator 320 and the inertia compensator 330. The speed regulator 320 compensates the filtered speed reference signal 340 for load torque changes in the electric motor. The load torque compensated signal 630 is then sent to adder 340.

The inertia compensator 330 compensates the filtered speed reference signal 340 for speed changes due to acceleration and deceleration of the electric motor. The inertia compensated signal 620 is then sent to the adder 340. As discussed above, the inertia compensated speed reference signal 620 is also sent to the current rate recovery system 200. This is so that the current rate recovery system 200 only considers the contribution from the inertia compensated speed reference signal 620 in determining the total accumulated lost current-seconds. This prevents wind up problems from the speed regulators contribution to the current reference.

The adder 340 adds the load torque compensated signal 630 from the speed regulator 320 to the inertia compensated speed reference signal 620 from the inertia compensator 330, an output to the total current reference signal 600.

Figure 3:
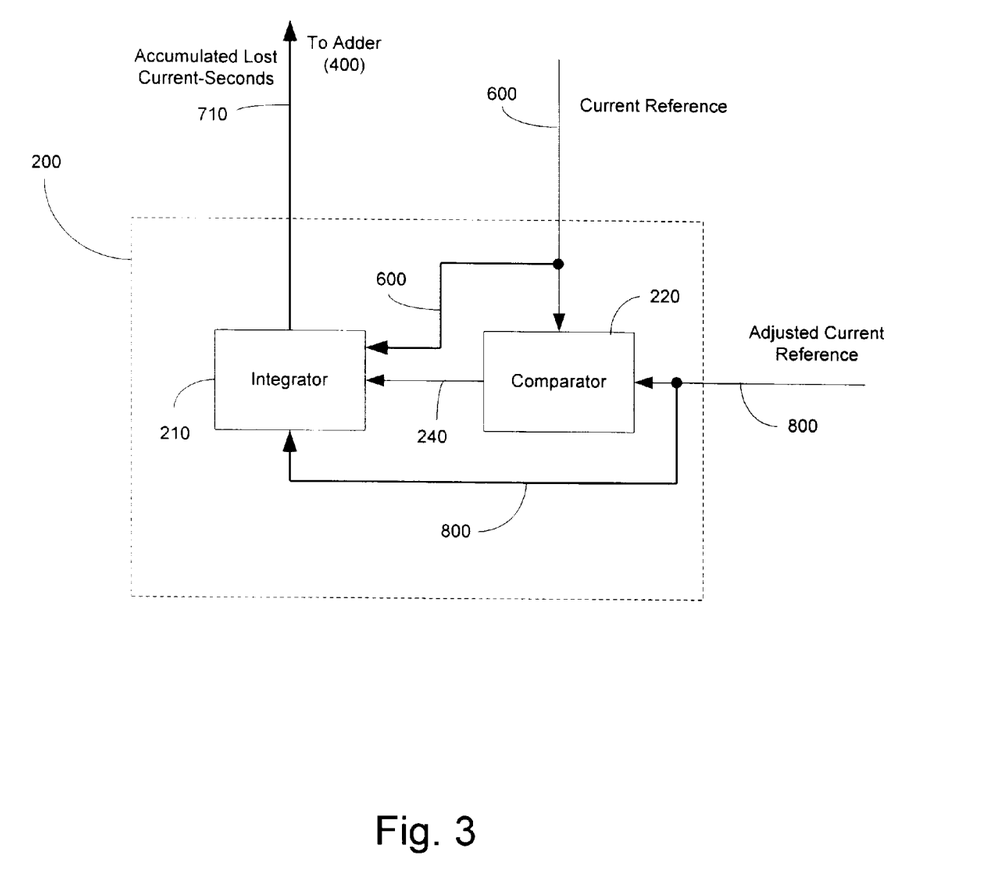
FIG. 3 is a block diagram of one preferred embodiment of the current rate recovery system of FIG. 1.

FIG. 3 shows one preferred embodiment of the current rate recovery system 200 shown in FIG. 1. The current rate recovery system 200 includes an integrator 210 and a comparator 220.

The adjusted current reference 800 and the current reference 600 are input to the comparator 220 and the integrator 210. The comparator 220 determines a difference between the current reference 600 and the adjusted current reference 800. The difference 240 is sent to the integrator 210, which integrates the difference value 240 over time to determine the total accumulated lost current-seconds. That is, the lost current-seconds is the difference between the current reference 600 and the adjusted current reference 800 over time. The lost current seconds are illustrated graphically and discussed below with reference to FIGS. 8A and 8B. The integrator outputs accumulated current seconds 710 to the adder 400 until he total accumulated lost current-seconds are recovered.

Figure 4:
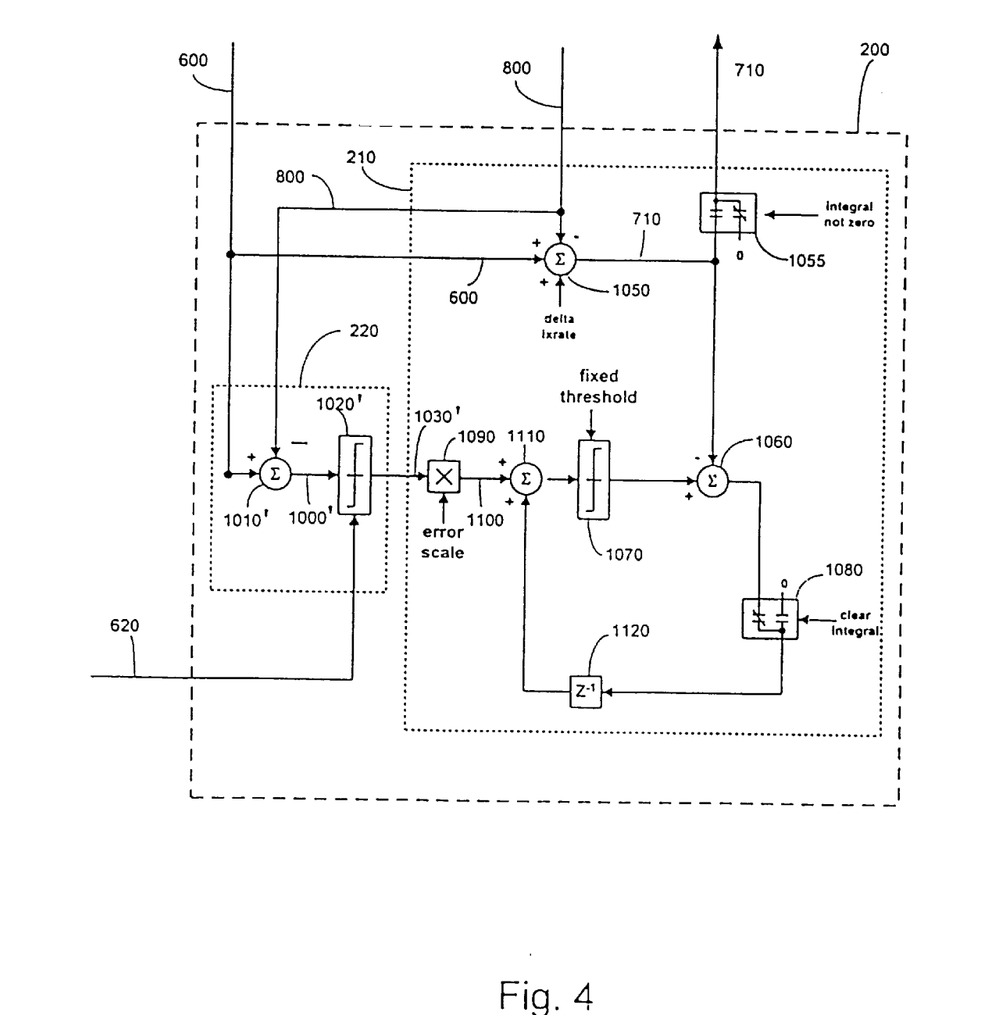
FIG. 4 is a schematic diagram of the comparator and integrator of FIG. 3, in accordance with one preferred embodiment of the present invention.

FIG. 4 is a schematic diagram of the comparator 220 and integrator 210 of FIG. 3, in accordance with one preferred embodiment of the present invention. The schematic diagram illustrated is for a control in positive current rate limit. The recovery function is driven by the error 1000' between the input to the current reference 600 and the adjusted current reference 800, which is calculated by the adder 1010'. The error 1000' represents the current-seconds lost due to the current rate limiter for one sampling period. The error 1000' is limited to the contribution from the inertia compensator 330 (FIG. 2), as represented by the inertia compensated speed reference signal 620, to prevent windup problems from the contribution to current reference 600 by the speed regulator 320 (FIG. 2). The limiting of the error 1000' is done by limiter 1020'.

The integrator 200 preferably includes an error scale 1090 to scale down the limited error 1030'0 that is accumulated. This prevents overshoot in the speed response. A separate error scale for motoring and regenerating current was needed because the current rate limiter 500 will allow much higher current rate limits in the regenerating direction than in the motoring direction. The scaled error 1100 is then sent to the adder 1110.

The scaled error 1100 is accumulated (integrated) by the integrator 210, as long as the rate of change of the current reference 600 is rate limited. The output of the adder 1050 represents the current seconds 710 that can be added to the adjusted current reference 800 by the adder 400 (FIG. 1). The rate of change of the current reference 600 is rate limited when the current-seconds 710 from the adder 1050 is zero. When the current reference 600 is no longer rate limited, as indicated by the current-seconds 710 from the adder 1050 not being equal to zero, a portion of the total accumulated lost current-seconds (represented by the current-seconds 710 output by the adder 1050) are summed into to the adjusted current reference 800 by adder 400 (shown in FIG. 1). This allows current-seconds 710 to be added back into the adjusted current reference 800 as quickly as the current rate limit function of the current rate limiter 500 (FIG. 1) will tolerate. The current rate limit function is represented by the value "delta ixrate" in FIG. 4.

A switch 1055 is used to turn off the recovery function when the integral calculated by the integrator 210 reaches zero, signifying that the total accumulated current-seconds have been recovered.

The integral is calculated by the integrator 210 by adding the scaled error 1100 to the total accumulated lost current-seconds with the adder 1110. A delay 1120 is used to represent the integration delay time between integrator calculations. The recovered current-seconds (those already added to the adjusted current reference 800) are subtracted from the total accumulated lost current-seconds by adder 1060. When the integral reaches zero, all the total accumulated lost current-seconds have been recovered. The total accumulated lost current-seconds is preferably limited to a fixed threshold by limiter 1070 to prevent a loss of closed-loop speed control caused by too many current-seconds being accumulated. A fail-safe mechanism, preferably a switch 1080, is preferably used that disables the integration function, by setting the integral to zero, when the polarity of the speed regulator/inertia compensator is different from the total accumulated lost current-seconds. This also prevents a loss of speed control from occurring.

Figure 5:
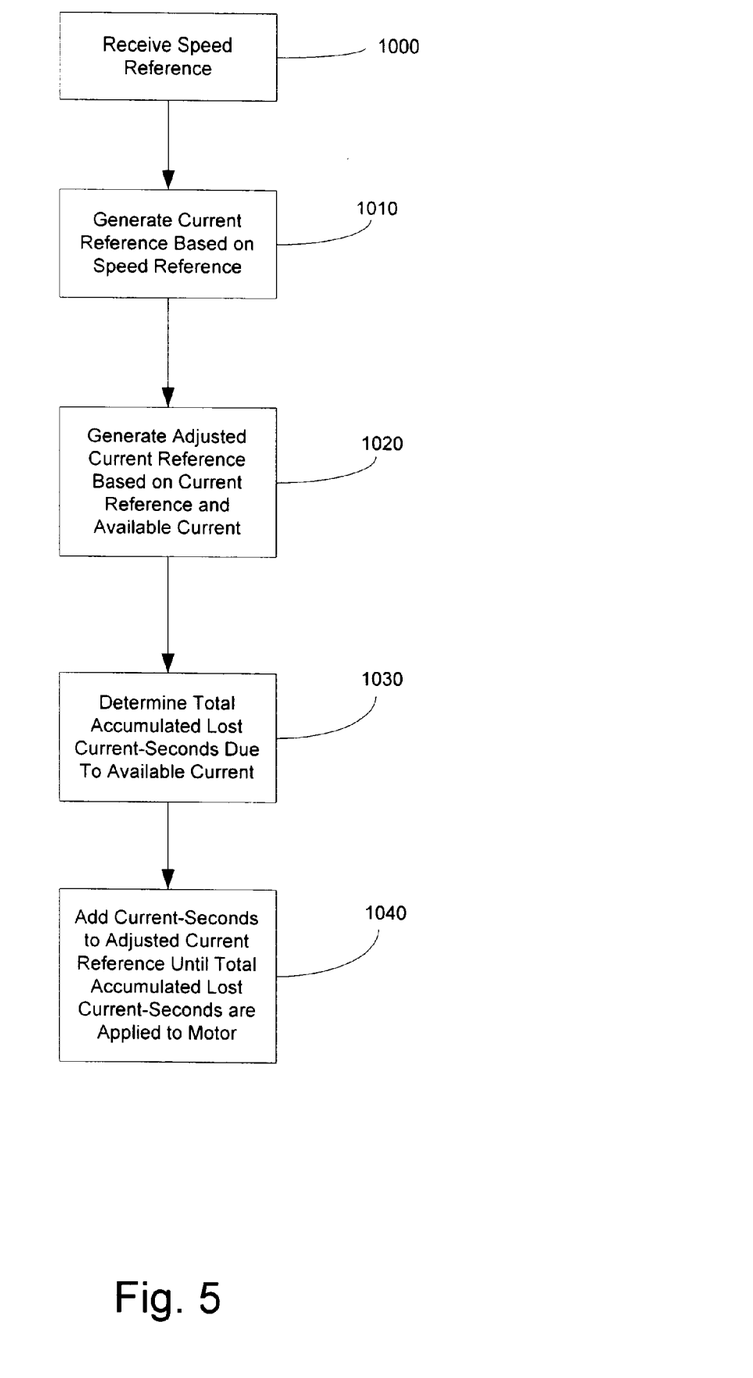
FIG. 5 is a flowchart of a method of driving an electric motor, in accordance with one embodiment of the present invention.

FIG. 5 is a flow chart of a method of driving an electric motor in accordance with one embodiment of the present invention. The method starts at step 1000 in which a speed reference is received. Next, step 1010, a current reference is generated based on the speed reference received at step 1000.

At step 1020, an adjusted current reference is generated based on the current reference generated at step 1010, and on the current available in the system. As discussed above, the available current may be limited by motor design limitations and/or lack of adequate driving voltage.

Next, at step 1030, the total accumulated lost current-seconds due to the current limitations is determined. Then, at step 1040, the current-seconds are added to the adjusted current reference until the total accumulated lost current-seconds are applied to the motor. As discussed above, the total accumulated lost current-seconds are applied to the motor over time as more current becomes available.

Figure 6:
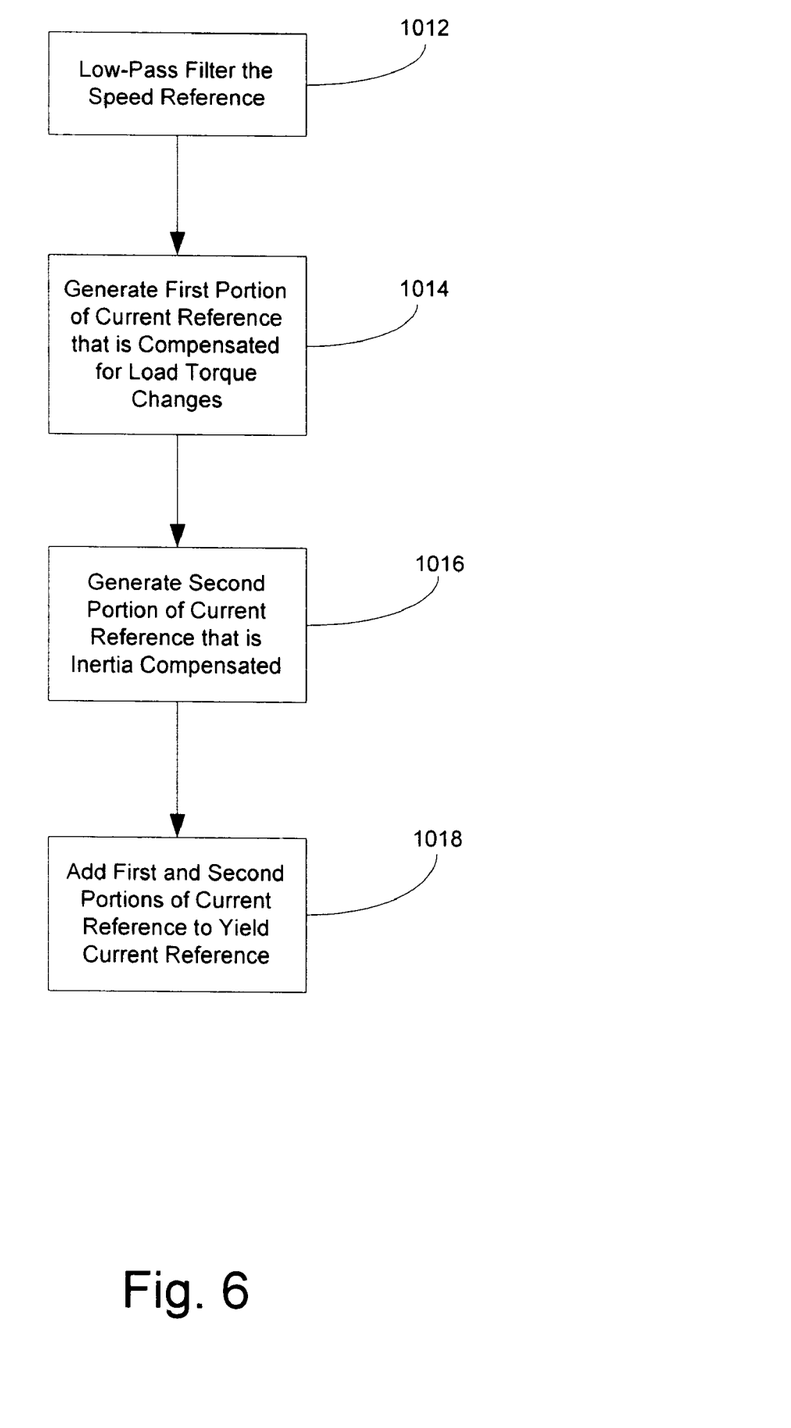
FIG. 6 is a flowchart of a preferred method for implementing the generate current reference step of FIG. 5.

FIG. 6 is a flow chart of a preferred method of implementing the generate current reference step 1010 in FIG. 4. The method starts at step 1012, in which the speed reference is low-pass filtered.

Next, at step 1014, a first portion of the current reference is generated that is compensated for load torque changes in the electric motor. Next, at step 1016, a second portion of the current reference is generated that is inertia compensated.

At step 1018, the first and second portions of the current reference generated at steps 1014 and 1016 respectively, are added together to yield the current reference.

Figure 7:
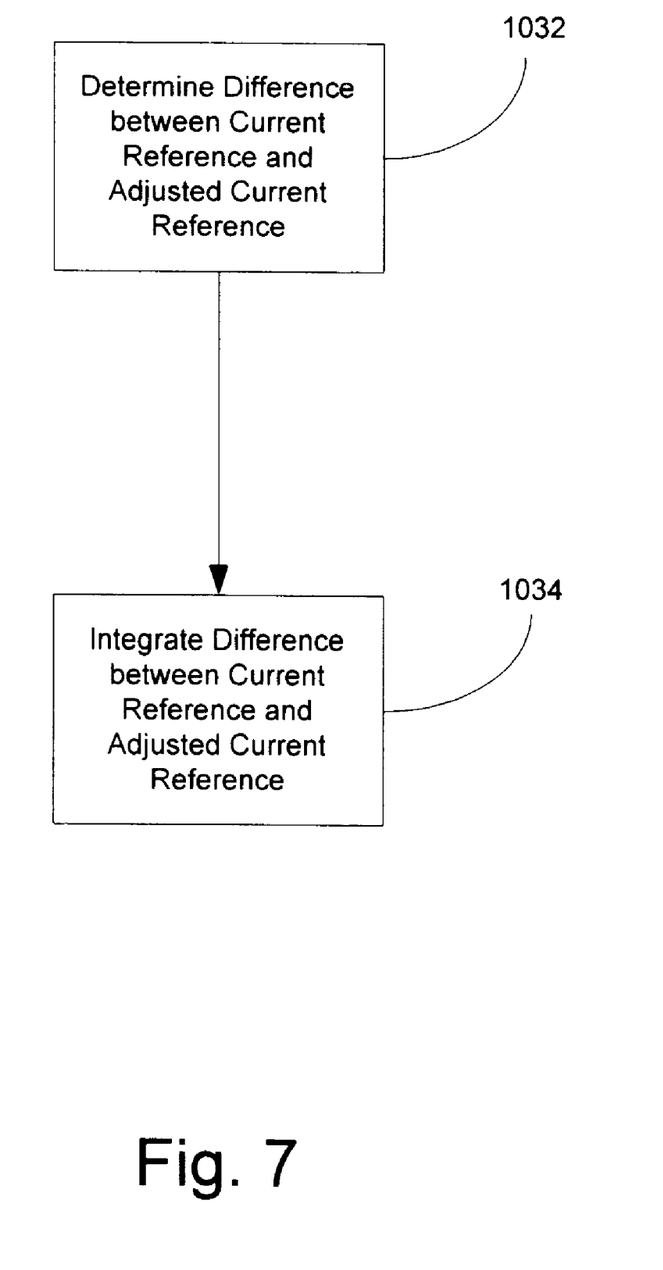
FIG. 7 is a flowchart of a preferred method for implementing the determine accumulated lost current-seconds step of FIG. 5.

FIG. 7 is a flow chart of a preferred method of implementing the determine accumulated loss current-second step 1030 of FIG. 4. The method starts at step 1032, in which a difference between the current reference and adjusted current reference is determined. Next, at step 1034, the difference between the current reference and the adjusted current reference is integrated.

Figure 8A:
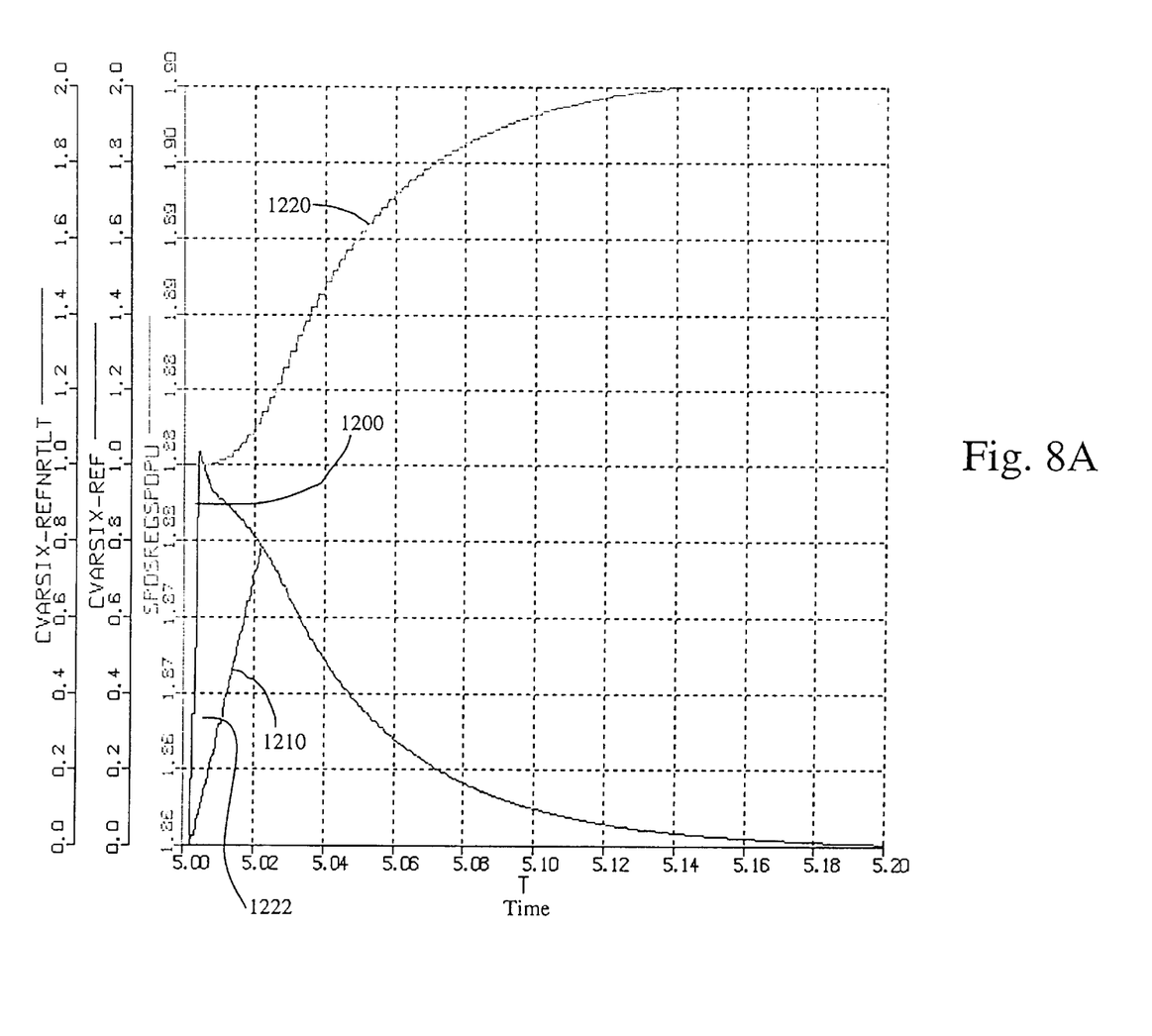
FIG. 8A is a graph showing a simulated response of a synchronous electric motor prior to incorporation of the present invention into the drive system.
Figure 8B:
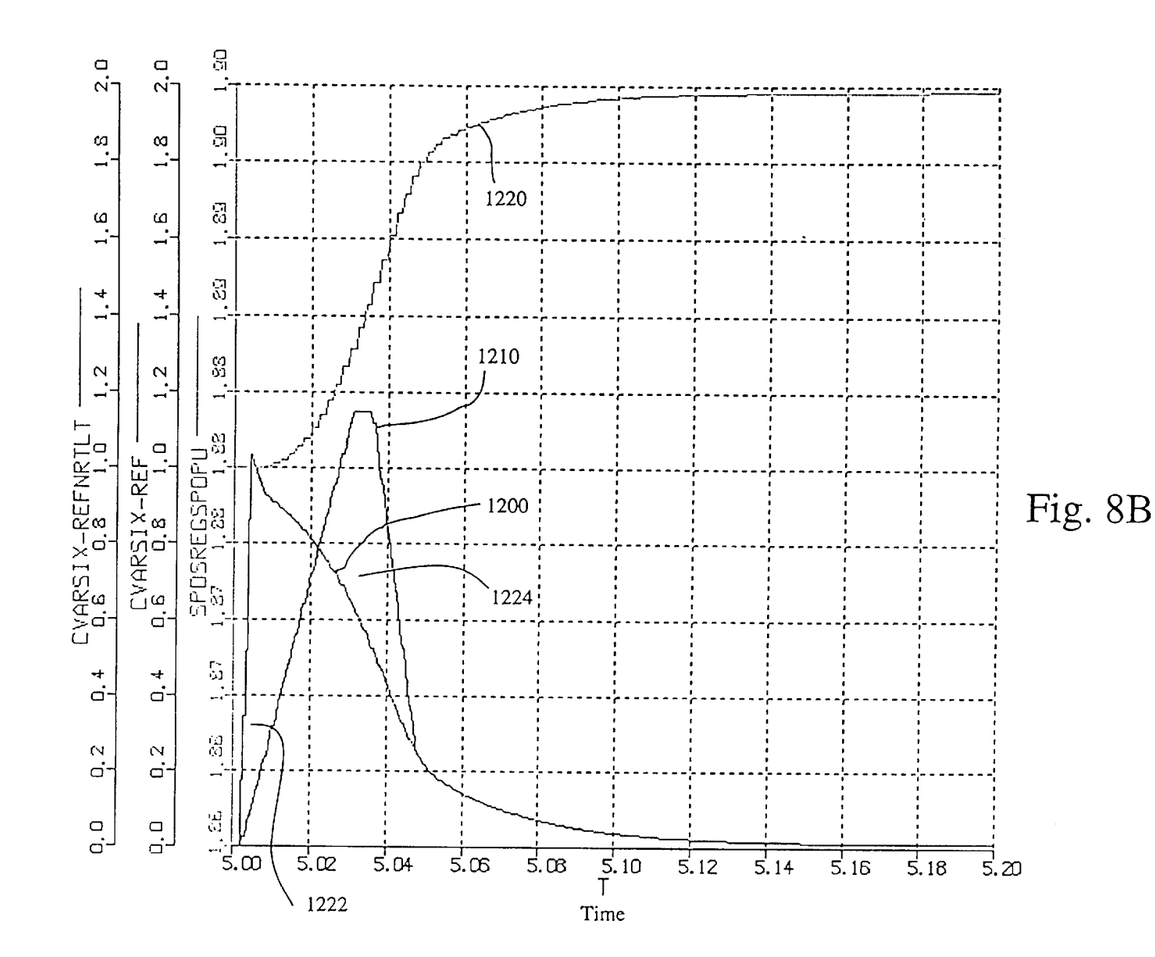
FIG. 8B is a graph showing a simulated response of a synchronous electric motor after the incorporation of the present invention into the drive system.

FIGS. 8A and 8B are graphs showing simulated responses of a synchronous electric motor before (FIG. 8A) and after (FIG. 8B) the present invention is incorporated into the drive system. In both graphs, signal 1200 is the current reference 600 before it is limited by the current rate limiter 500, signal 1210 is the sum of the adjusted current reference 800 and the current-seconds 710 output by the current rate recovery system 200, and signal 1220 is the speed response of the motor. All signals are plotted as a function of time. Both graphs represent a system in which a 2% of base speed step is applied to the speed reference 700.

In FIG. 8A, the area between the current reference signal 1200 and the adjusted current reference signal 1210 represents the total current-seconds lost due to current rate limiter 500. In FIG. 8B, the same total lost current-seconds are present, as shown by the area 1222 between the signal 1200 and the signal 1210. However, the total lost current-seconds are recovered after the two current signals 1200 and 1210 intersect. That is, such lost current-seconds that are recovered are shown by the area 1224 between the signal 1200 and 1210. As shown by the speed response signal 1220, the speed response of the motor when the present invention is incorporated is faster. The speed response signal 1220 has an "S"-shape with the present invention, as compared to a more exponential shape without the present invention. Further, the speed response signal 1220 does not exhibit any undesirable overshoot after the present invention is incorporated.

The system shown in FIGS. 1–4, and the methods shown in FIGS. 5–7 are preferably implemented using firmware. However, the system and method of the present invention can also be implemented on a programmed general purpose computer, a special purpose computer, a programmed microprocessor or micro controller and peripheral integrate circuit elements, and ASIC, or other integrated circuit, a hardwired electronic of logic circuit such as a discrete element circuit, a programmable logic device such as a FPGA, PLD, PLA, or PAL, or the like. In general, any device in which a finite state machine capable of implementing the methods illustrated in FIGS. 5–7 can be used to implement the present invention.

While the foregoing description includes many details and specificities, it is to be understood that these have been included for purposes of explanation only, and are not to be interpreted as limitations of the present invention. Many modifications to the embodiments described above can be made without departing from the spirit and scope of the invention, as is intended to be encompassed by the following claims and their legal equivalents.

What is claimed is:

1. A system for driving an electric motor, comprising:
   a current reference generator that generates and outputs a current reference based on a speed reference;
   a current rate limiter that receives the current reference and outputs an adjusted current reference based on available current, wherein the adjusted current reference is used by a current source to determine a current level applied to the electric motor;
   a current rate recovery system that determines total accumulated lost current-seconds due to the current rate limiter and outputs current-seconds to be added to the adjusted current reference; and
   a first adder that adds the current-seconds to the adjusted current reference output by the current rate limiter until the total accumulated lost current-seconds are applied to the electric motor.

2. The system of claim 1, wherein the current rate recovery system comprises:
   a comparator that determines a difference between the current reference and the adjusted current reference; and
   an integrator that receives and integrates the difference between the current reference and the adjusted current reference over time, and outputs at least a portion of the integrated difference between the current reference and the adjusted current reference as the current-seconds to be added to the adjusted current reference.

3. The system of claim 2, wherein the integrator has a predetermined integration limit that limits the total accumulated lost current-seconds to a predetermined maximum value.

4. The system of claim 2, wherein the current reference generator comprises:
   a low pass filter that filters the speed reference;
   a speed regulator that receives the filtered speed reference and outputs a first portion of the current reference that is compensated for load torque changes in the electric motor;
   a inertia compensator that receives the filtered speed reference and outputs a second portion of the current reference that is inertia compensated; and
   a second adder that adds the first and second portions of the current reference to yield the current reference.

5. The system of claim 4, wherein a crossover frequency of the low pass filter is set to a predetermined inertia compensation speed response.

6. The system of claim 4, wherein the integration performed by the integrator is limited to a contribution from the inertia compensator.

7. The system of claim 6, wherein the integrator has a predetermined integration limit.

8. The system of claim 4, wherein the comparator comprises:
   an adder that determines a difference between the current reference and the adjusted current reference; and
   a limiter that limits the difference determined by the adder to a contribution from the inertia compensator.

9. The system of claim 4, wherein the integrator comprises:
- an error scale that scales down the difference between the current reference and the adjusted current reference; and
- a fail-safe mechanism that disables an integration function when a polarity of one or both of the speed regulator and the inertia compensator is different than a polarity of the total accumulated lost current seconds.

10. The system of claim 9, wherein the fail-safe mechanism comprises a switch that sets an integration value to zero when a polarity of one or both of the speed regulator and the inertia compensator is different than a polarity of the total accumulated lost current seconds.

11. A current rate recovery system for an electric motor drive system, comprising:
- a comparator that determines a difference between a current reference and an adjusted current reference generated by the electric motor drive system; and
- an integrator that receives and integrates the difference between the current reference and the adjusted current reference over time, and outputs at least a portion of the integrated difference between the current reference and the adjusted current reference as current-seconds to be added to the adjusted current reference.

12. The system of claim 11, wherein the integrator has a predetermined integration limit.

13. A method of compensating for current-rate limitations in an electric motor drive system, comprising the steps of:
- monitoring total accumulated current-seconds lost due to a lack of available current; and
- recovering the total accumulated current-seconds lost as sufficient current becomes available; and
- wherein the monitoring step comprises:
  - determining a difference between a current reference and an adjusted current reference generated by the electric motor drive system; and
  - integrating the difference between the current reference and the adjusted current reference over time to yield the total accumulated current-seconds lost.

14. The method of claim 13, wherein the recovering step comprises adding at least a portion of tbe integrated difference between the current reference and the adjusted current reference to the adjusted current reference.

15. The method of claim 13, wherein the integration has a predetermined integration limit that limits the total accumulated current-seconds lost to a predetermined maximum value.

16. A method of driving an electric motor comprising the steps of:
- receiving a speed reference;
- generating a current reference based on the speed reference;
- generating an adjusted current reference based on the current reference and on available current, wherein the adjusted current reference is used by a current source to determine a current level applied to the electric motor;
- determining total accumulated lost current-seconds due to the available current; and
- adding current-seconds to the adjusted current reference until the total accumulated lost-current seconds are applied to the electric motor.

17. The method of claim 16, wherein the total accumulated lost current-seconds are determined by:
- determining a difference between the current reference and the adjusted current reference; and
- integrating the difference between the current reference and the adjusted current reference over time to yield the total accumulated lost current-seconds.

18. The method of claim 16, wherein the current reference is generated by:
- low-pass filtering the speed reference;
- generating a first portion of the current reference that is compensated for load torque chances in the electric motor;
- generating a second portion of the current reference that is inertia compensated; and
- adding the first and second portions of the current reference to yield the current reference.

19. The method of claim 18, wherein a crossover frequency of the low pass filtering step is set to a predetermined inertia compensation speed response.

20. The method of claim 17, wherein the integration is limited to a predetermined integration limit that limits the total accumulated lost current-seconds to a predetermined maximum value.

* * * * *